(12) United States Patent
Marshall

(10) Patent No.: US 10,795,156 B2
(45) Date of Patent: Oct. 6, 2020

(54) WAVEGUIDE STRUCTURE

(71) Applicant: BAE SYSTEMS plc, London (GB)

(72) Inventor: Ian Marshall, Rochester Kent (GB)

(73) Assignee: BAE SYSTEMS PLC, London (GB)

( * ) Notice: Subject to any disclaimer, the term of this patent is extended or adjusted under 35 U.S.C. 154(b) by 21 days.

(21) Appl. No.: 16/306,823

(22) PCT Filed: May 31, 2017

(86) PCT No.: PCT/GB2017/051551
§ 371 (c)(1),
(2) Date: Dec. 3, 2018

(87) PCT Pub. No.: WO2017/207987
PCT Pub. Date: Dec. 3, 2018

(65) Prior Publication Data
US 2019/0155027 A1    May 23, 2019

(30) Foreign Application Priority Data

May 31, 2017    (GB) .................................. 1609706.5

(51) Int. Cl.
| | |
|---|---|
| *G02B 6/10* | (2006.01) |
| *G02B 6/12* | (2006.01) |
| *G02B 27/01* | (2006.01) |
| *G02B 6/00* | (2006.01) |

(52) U.S. Cl.
CPC ........... *G02B 27/0101* (2013.01); *G02B 6/00* (2013.01); *G02B 6/105* (2013.01); *G02B 6/12* (2013.01);

(Continued)

(58) Field of Classification Search
CPC ............................ G02B 27/0101; G02B 6/105
See application file for complete search history.

(56) References Cited

U.S. PATENT DOCUMENTS

| | | |
|---|---|---|
| 8,368,844 B2 | 2/2013 | Ishikiawa et al. |
| 10,108,009 B2 | 10/2018 | Watanabe |
| (Continued) | | |

FOREIGN PATENT DOCUMENTS

| | | |
|---|---|---|
| GB | 2500631 A | 10/2013 |
| JP | 2005504339 A | 2/2005 |
| (Continued) | | |

OTHER PUBLICATIONS

International Search Report and Written Opinion received for PCT Application No. PCT/GB2017/051551, dated Oct. 12, 2017. 15 pages.

(Continued)

*Primary Examiner* — Sung H Pak
*Assistant Examiner* — Hoang Q Tran
(74) *Attorney, Agent, or Firm* — Finch & Maloney PLLC

(57) ABSTRACT

An optical waveguide device for use in a head up display. The waveguide device provides pupil expansion in two dimensions. The waveguide device comprise a primary waveguide and a secondary waveguide, the secondary waveguide being positioned on a face of the primary waveguide. The secondary waveguide has a diffraction grating on a face opposite to the face which contacts the primary waveguide. The diffraction grating diffracts light into more than diffraction order. Rays diffracted into a non-zero order are trapped in the secondary waveguide by total internal reflection.

20 Claims, 9 Drawing Sheets

(52) U.S. Cl.
CPC .............. *G02B 2006/12104* (2013.01); *G02B 2006/12116* (2013.01)

(56) References Cited

U.S. PATENT DOCUMENTS

| | | | |
|---|---|---|---|
| 2011/0170036 A1 | 7/2011 | Ishikawa et al. | |
| 2014/0064655 A1* | 3/2014 | Nguyen | G02B 6/0076 385/11 |
| 2015/0002528 A1* | 1/2015 | Bohn | G02B 27/0172 345/589 |

FOREIGN PATENT DOCUMENTS

| | | |
|---|---|---|
| JP | 2007011057 A | 1/2007 |
| JP | 2011146185 A | 7/2011 |
| JP | 2015184385 A | 10/2015 |
| WO | 2003/027754 A1 | 4/2003 |
| WO | 2005/024969 A2 | 3/2005 |
| WO | 2016020643 A1 | 2/2016 |
| WO | 2016054092 A1 | 4/2016 |
| WO | 2016/123145 A1 | 8/2016 |
| WO | 2017/207987 A1 | 12/2017 |

OTHER PUBLICATIONS

GB Search Report received for GB Application No. 1609706.5, dated Dec. 7, 2016. 3 pages.

International Preliminary Report on Patentability received for PCT Application No. PCT/GB2017/051551, dated Dec. 13, 2018. 10 pages.

\* cited by examiner

WAVEGUIDE STRUCTURE

This disclosure relates to optical waveguides and is particularly, but not exclusively, relevant to optical waveguides for head up displays.

Head up displays utilise a transparent component, which the user looks through, to overlay an image on the user's actual view of the surroundings. The user's eye receives light from those surroundings in the normal way, and the user's eye also receives light from the head up display system. An image from the head up display is thus overlaid on the actual surroundings.

The transparent component of a head up display may be either mounted in a fixed position on equipment being used by a user (for example the cockpit of an aircraft), or on the head of the user (for example as a pair of spectacles, or on a helmet) such that the component moves with the user's head and thus remains at a fixed location in relation to the user's eye.

A fundamental requirement of a head up display is to couple light from an image source to the location required for viewing by the user. This may be accomplished utilising a waveguide system as shown schematically in cross section in FIG. 1.

Waveguide body 10 is formed from an optically transmissive material which propagates light at the required wavelengths. Waveguide 10 is a piece of glass or other optically transmissive material with parallel faces which traps a light beam within the waveguide. Waveguides utilising refracting and reflecting surfaces to inject the light beam into the waveguide, to propagate it within the waveguide, and/or to project it out from the waveguide are generally known as prismatic waveguides. Waveguides using diffraction gratings for these functions are generally known as holographic waveguides. FIG. 1 is an example of a prismatic waveguide.

In the case of a prismatic waveguide, Projector 11 projects an image into the waveguide 10, via input optics 12 and input coupling device 13. Input optics 12 are arranged to distribute the projected image over an input pupil of input coupling device 13. The near-field of that pupil represents the distribution of light across the pupil, while the far field represents the image information. It is desirable for the image (far field) displayed to the user to be focussed a long way from the eye, which will be referred to as infinity. The waveguide system is arranged to preserve ray direction between the input pupil and an output pupil (through which the image is viewed), and accordingly the input optics 12 are arranged to focus the image (far field) at infinity at the input pupil. Therefore, at the input pupil each pixel of the image is represented by a bundle of parallel rays distributed across the input pupil. Each pixel of the image is represented by a bundle of rays at unique angles. Once focussed onto the retina of the user, by an eye lens focussed at infinity, the projected image is recreated.

For clarity, the rays propagating through the waveguide system are represented by a single ray 14, but as will be appreciated this represents a number of bundles of parallel rays distributed over an area, with each bundle propagating at a different angle.

Input coupling device 13 couples the ray 14 into waveguide body 10. The rays enter input coupling device 13 at an angle that allows transmission or reflection of ray 14 into the waveguide 10. The rays are refracted or reflected, or a combination of both processes, by input coupling device 13, such that they are trapped in the waveguide 10 by total internal reflection at the top and bottom faces. Output coupling device 15 refracts light back to its original angles and the ray exits the waveguide. The output coupling device 15 is arranged to counteract and compensate any colour dependent variations of the angle of ray 14 within the waveguide that are introduced by the input device 13.

As at the input, the output light is distributed over an output pupil. For optimum performance, the waveguide system should preserve the far-field (ray angles) of the light between the input and output pupils, and provide a uniform distribution of intensity across the output pupil, which is called the near field.

The device of FIG. 1 utilises refractive prisms for the input and output coupling devices, but this is only an example. As will be appreciated any appropriate device may be utilised. For example, FIG. 2 shows a waveguide system in which diffraction gratings 20, 21 are utilised to provide the input and output coupling devices. Although any input and output coupling structure may be utilised the devices must be matched to preserve the far field. For example, different wavelengths of light may diverge while passing through the input coupling device 13/20, which divergence must be corrected at the output coupling device 15/21. Devices 13, 15, 20, 21 have been shown as transmissive components, but reflective components of the same type could also be utilised.

To allow for flexibility in the alignment of the user's eye with the device the output pupil should be large. For example, an exit pupil of greater than 12 mm diameter may be desirable.

However, the exit pupil has to be located at the eye, and therefore has to be illuminated by rays that are arranged to intersect that particular area, which is remote from the waveguide and from the input optics 12. Furthermore the exit pupil must be illuminated by the whole of the far field. In order to achieve this without a waveguide the ray paths from the input optics 12 have to illuminate most of the area of the exit pupil from every angle in the far field. Hence the input optics 12 would have to be very large and heavy because they are some distance away from the exit pupil.

A waveguide may be utilised to translate rays from the input optics 12 until they are projected onto the exit pupil; and the ray paths are divided up into multiple paths that can intersect the exit pupil. This is achieved without unduly changing the far field.

This invention may be applied to the design of waveguides that are similar but have different trade-offs in the design aspects. Some waveguides will be designed to produce a large exit pupil through multiple replications of the input pupil, which may be typically 30 mm across. This makes the device usable when the observer's eye is less constrained to be aligned with the waveguide. Other waveguides will be designed with less pupil replication, leading to a smaller exit pupil and brighter display, but one that is harder to use. Other waveguides will have a small exit pupil and the observer's eye will be constrained, so that stray light paths that escape from the waveguide are arranged to miss the eye so that they are not visible.

The waveguide system may therefore be designed to expand the near field such that the output pupil is larger than the input pupil. This expansion is commonly known as pupil replication. This is achieved by dividing the light beam into many components that only partially overlap in order to increase the size of the near field, without degrading the far field of the beam (i.e. ray directions are preserved). Pupil expansion should be achieved without disturbing the light luminance over the near field. Variations in luminance across the near field appear as changes in image brightness as the user's eye moves across the output pupil.

This expansion may be achieved utilising a diffractive or semi-reflecting structure in, or on the surfaces of, waveguide 10. In the example of FIG. 1 a semi-reflecting surface 16 is provided through the waveguide. The semi-reflecting surface splits the light into two directions, the main ray 17a and a second ray 17 only shown partially. Ray 17 propagates to the output pupil in the same way as described for ray 17a but is offset in the view of FIG. 1. If the semi-reflecting surface 16 has a 50% reflectivity rays 17a and 17 will be of equal power.

Achieving the required optical performance with reflective and refractive structures can be difficult because these mechanisms produce sharp boundaries in pupil illumination giving uneven near field distribution of light leading to pupil banding in the image visible to the user.

In the example of FIG. 2, the diffraction grating 20 deviates light into a diffracted order. That diffraction occurs at different ray angles within the waveguide that are dependent on the wavelength of the light that is diffracted. The resultant dispersion of ray angles causes a widely dispersed far field whose ray angles are strongly influenced by the wavelength of the light.

The ray angles define the far field light pattern and contain the image bearing information in the display system.

Grating 21 is arranged to have the opposite effect of grating 20, so that the widely dispersed colours within the waveguide are recombined. The information content of the far field is therefore reconstructed with minimal residual colour dependent dispersion.

Within the waveguide the paths taken by rays 17 and 17a are substantially different for different wavelengths and therefore reconstruct the near field with blurred boundaries. A holographic waveguide is therefore preferable to a prismatic waveguide in this respect. However, the wide dispersion of light within the waveguide causes limitations on how much colour or how much variation in ray angles can be transmitted through the waveguide. The product of wavelength range with ray angles is generally referred to as bandwidth. A prismatic waveguide is may be preferable to a holographic waveguide in this respect.

In the example of FIG. 2, a semi-reflecting surface 22 is used to divide the ray paths 14a up into multiple paths 17 and 17a, thus enabling the replication and expansion of the pupil of input optics 12.

Semi-reflecting surfaces 16 and 22 may be provided by forming the waveguide 10 from two pieces of material. The semi-reflecting surface is formed on one piece of the material and the two pieces are bonded together such that the surface are within the resulting waveguide as shown in FIGS. 1 and 2. Alternatively the diffraction grating may be positioned on the outer surfaces of the waveguide. The beam is trapped by total internal reflection, but the field of the beam interacts with the grating on the surface leading to diffraction. A single diffracted ray (order) is shown in FIG. 2, but multiple orders of diffraction may be created, each at a different angle.

The design shown in FIG. 2 may be changed by the removal of diffraction gratings 20 and 21; and by changing semi-reflecting surface 22 into a partially transmitting and partially reflecting diffraction grating. In this configuration, the grating properties may be arranged such that some light that is diffracted and spread into many directions dependent on its wavelength, may be diffracted back such that the initial wavelength spreading is compensated and the full image bearing information is restored. The restored light would have ray angles that are able to leave the waveguide and traverse to the eye. The action of the grating would also leave some light within the waveguide that is not compensated, but which is arranged to be travelling in directions with angles greater than the critical angle of the material, and thus will be trapped in the waveguide 10 by total internal reflection.

The proportion of light energy that is split into each diffracted order by a diffraction grating is called the diffraction efficiency. In order to achieve reasonable diffraction efficiency, and to reduce ghost ray paths associated with unwanted diffraction orders, the diffraction grating fringes are usually shaped with a profile approximating to a triangular cross section, giving a saw tooth profile to the grating. Such gratings are commonly known as blazed gratings. The pitch of suitable diffraction gratings is typically approximately 0.5 microns, at which scales blazed gratings are difficult and expensive to fabricate with the required performance.

Blazed gratings tend to be expensive because their designers are attempting to diffract the majority of the light into one order. By relaxing this condition, gratings may be made less expensive and of higher quality. An alternative to blazed gratings are square wave gratings, where the fringe profile takes a square or rectangular shape. These diffract light into more than one order. This description utilises the term 'square wave' grating to describe gratings whose fringe profiles are formed by generally rectangular sections of material that are deposited on a substrate. They have the common feature of being designed to diffract light into more than one direction and may be extended in form to a generally rectangular shaped material, or ones in which multiple layers of different shapes are deposited on top of each other, and ones in which the composite shapes start to approximate to a blazed profile. Other photolithographic methods may extend the choice of profiles that are shaped like sine functions, or combinations of sine functions. The generic difference to blazed gratings is that the deliberate diffraction into more than one order is being incorporated into the waveguide design.

It is desirable to replicate the pupil in 2 dimensions. However, the mechanisms described above with reference to FIGS. 1 and 2 only replicate the pupil in one dimension (laterally across the page, not in the axis perpendicular to the page). The input pupil thus has to be the size of the exit pupil in the unreplicated direction, which is at right angles to the plane containing FIG. 1 and FIG. 2. Replication in the $2^{nd}$ perpendicular direction can be achieved in a holographic waveguide using multiple diffraction gratings arranged at angles to one another. Forming such gratings is difficult and expensive.

An aspect of the invention is that two waveguide components are bonded together, such that each is substantially 1 Dimensional, but they are orientated at substantially orthogonal directions such that the Pupil Replication occurs in 2 directions. The result is a waveguide that is compact like a 1 Dimensional waveguide, but expands the pupil in 2 dimensions.

A further constraint on waveguide design is that the range of ray angles within the waveguide are limited to lie between three conditions:
  1) The ray angles have to be sufficiently large to exhibit TIR so that light is contained within the waveguide.
  2) In the case of a Holographic Waveguide, the ray angles have to be small enough to support diffraction.

3) In the case of a Prismatic Waveguide, the ray angles must be small enough to reflect multiple times within the waveguide.

The range of angles is the difference between the upper limit on the size of the ray angles described in 2) or 3) less the lower limit to the ray angle described in 1). This range of angles, when multiplied by the refractive index of the waveguide material, contributes towards the bandwidth of the waveguide. Bandwidth is also limited by the action of the diffraction gratings in spreading ray angles over a range of values dependent on the wavelength of the light, such that the angle limitations in 1) and 2) above cause variations in colour rendition across the far field. Hence bandwidth serves to limit the field of view to lie within boundaries, but the width of angle variation within those boundaries is partially dependent on the acceptable quality of the near and far fields.

There is therefore a requirement for a waveguide system to provide pupil replication.

The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided an optical waveguide for a head up display, the optical waveguide being configured to provide pupil expansion in two dimensions, the waveguide comprising a primary waveguide having an input end and an output end, a secondary waveguide positioned on a face of the primary waveguide between the input end and the output end, there being an interface between the primary waveguide and secondary waveguide, the refractive index of the primary waveguide being lower than the refractive index of the secondary waveguide, and a main diffraction grating on a face of the secondary waveguide, which face is parallel and opposite to the interface with the primary waveguide.

The optical waveguide according may further comprise an optical coating between the main and secondary waveguides.

The lines of the main diffraction grating may be parallel with an axis from the input end to the output end of the waveguide.

The main diffraction grating may deviate at least some incident light in a direction substantially orthogonal to an axis from the input end to the output end.

The optical waveguide according may further comprise an input section, wherein the input section is configured to couple light into the main waveguide such that the light is guided by total internal reflection at waveguide/air interfaces of the main waveguide and of the secondary waveguide.

The optical waveguide according may further comprise an output section at the output end of the waveguide, wherein the output section is configured to direct light propagating in the main waveguide out of that waveguide to an output pupil of the optical waveguide The input section may comprise a face of the main waveguide which reflects light by total internal reflection, and the output section comprises a partially reflective mirror in a plane which is parallel to the face of the main waveguide forming the input section.

The output section may comprise a plurality of partially reflective mirrors, each mirror being in a plane parallel to the face of the main waveguide forming the input section.

The input section may comprise an input diffraction grating; and the output section comprises an output diffraction grating.

The main diffraction grating may diffract incident light into at least a zero and a first diffraction order, and wherein the interface is configured such that light diffracted into the first diffraction order is reflected by total internal reflection at the interface, while light in the zero diffraction order passes through the interface.

The main diffraction grating may diffract incident light into at least a zero, and two first diffraction orders, and wherein the two first diffracted orders traverse the secondary waveguide in opposing lateral directions relative to an axis from the input end to the output end, and wherein the interface is configured such that light diffracted into the first diffraction orders are reflected by total internal reflection at the interface, while light in the zero diffraction order passes through the interface.

The main diffraction grating may diffract incident light into at least a zero, two first, and a third diffracted order, and wherein the interface is configured such that light diffracted into the first and third diffraction orders are reflected by total internal reflection at the interface, while light in the zero diffraction order passes through the interface.

The main diffraction grating may be fabricated from material deposited onto the secondary waveguide such that the fringe profile is substantially rectangular, with the distance between the deposited material being substantially the same as the width of the deposited material.

The main diffraction grating may be fabricated from material deposited onto the secondary waveguide such that the fringe profile is substantially rectangular, with the distance between the deposited material being substantially different from the width of the deposited material.

The main diffraction grating may be fabricated from material deposited in multiple layers such that each layer has different widths, different gaps between the material, and where the alignment of the layer to the layer below it may offset the centre of its profile relative to the centre of the profile of the layer below it.

The main diffraction grating may be fabricated from material deposited on the secondary waveguide as a photoresist and processed to a fringe profile by means of exposure to light.

The depth of the main grating fringe profile may be varied across the aperture of the main grating to vary the amount of light in the diffracted orders.

The light paths in the secondary waveguide may be designed such that not all diffracted rays are trapped by total internal reflection, such that the bandwidth of the secondary waveguide is increased; and so arranged such that diffracted rays that are not trapped exit the waveguide at an angle such that the rays miss the exit pupil.

The interface between the primary and secondary waveguides may be coated with a coating that increases the reflection of that interface for rays which are not totally internally reflected.

The main grating fringe profile may be approximately blazed such that the majority, but not all, light incident on the main grating is diffracted into one of the first diffracted orders.

The main grating fringe profile may be approximately blazed such that the majority, but not all, light incident on the main grating is diffracted into a combination the zero order and one of the first diffracted orders.

The critical angle of the interface for rays propagating in the secondary waveguide may be about 55.25 degrees.

The refractive index of the primary waveguide may be about 1.52.

The refractive index of the secondary waveguide may be about 1.85.

The interface may be partially reflective.

The main diffraction grating may not be a blazed grating.

The main diffraction grating may be configured to diffract light into more than one diffraction order.

The diffraction grating may be selected from a binary diffraction grating, a symmetrical triangle grating, a sinusoidal grating, a grating with all faces in a first or a second plane wherein the first and second planes are perpendicular to each other.

The grating may be formed using photolithography.

The disclosure provided here may provide waveguides which are smaller and lighter than other waveguide designs, but which do not produce stray light paths.

BRIEF DESCRIPTION OF THE DRAWINGS

Embodiments of the invention will be described, by way of example, with reference to the following drawings, in which.

DETAILED DESCRIPTION

Figure 1:
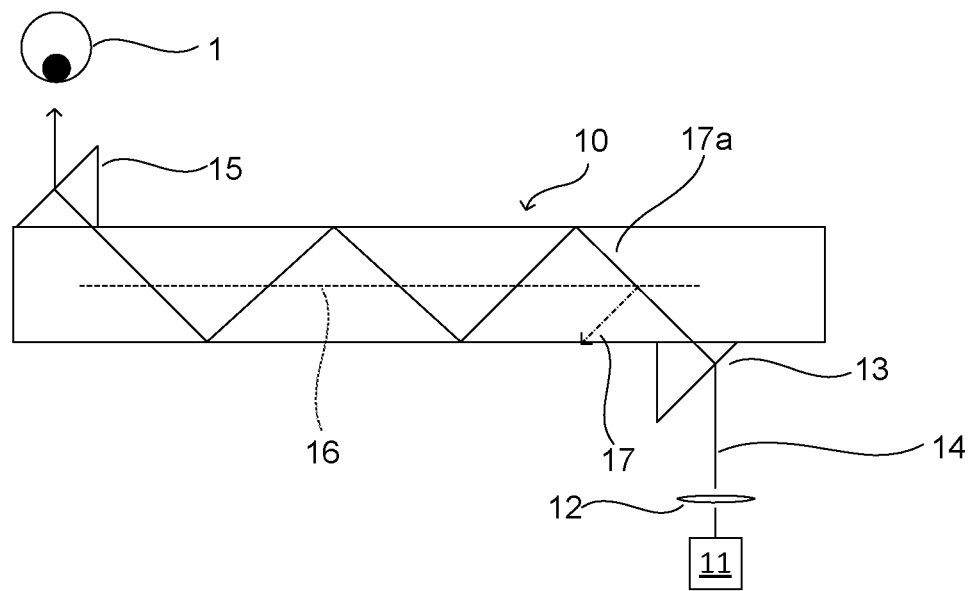
FIG. 1 shows a cross-section of a prismatic waveguide structure.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 3:
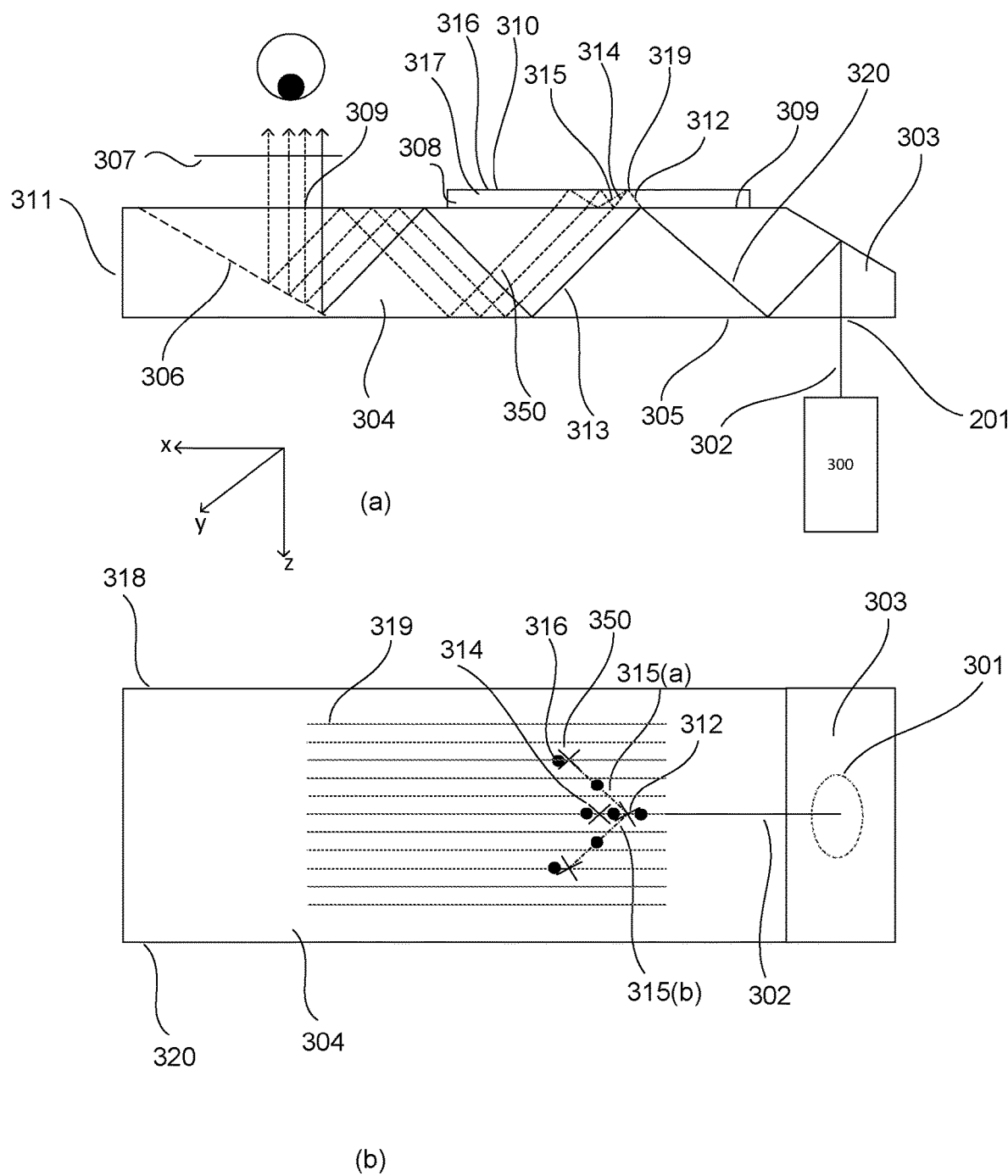
FIG. 3(a) shows a cross-section of a dual waveguide structure.
FIG. 3(b) shows a plan view of a dual waveguide structure.

FIG. 3 shows (a) a schematic cross-section and (b) a schematic plan view of a waveguide for a head up display which utilises a simple square-wave diffractive grating in a prismatic waveguide.

Projector 300 is configured to project an image into the entrance pupil 201 of the waveguide. As explained above, at the entrance pupil the far field is focussed at a long distance, effectively infinity. In an example, the entrance pupil is 8 mm×12 mm with the long dimension orthogonal to the page in FIG. 2. The field of view may be 30 degrees×20 degrees. As described previously, a single ray 302 is used for illustration purposes.

Figure 2:
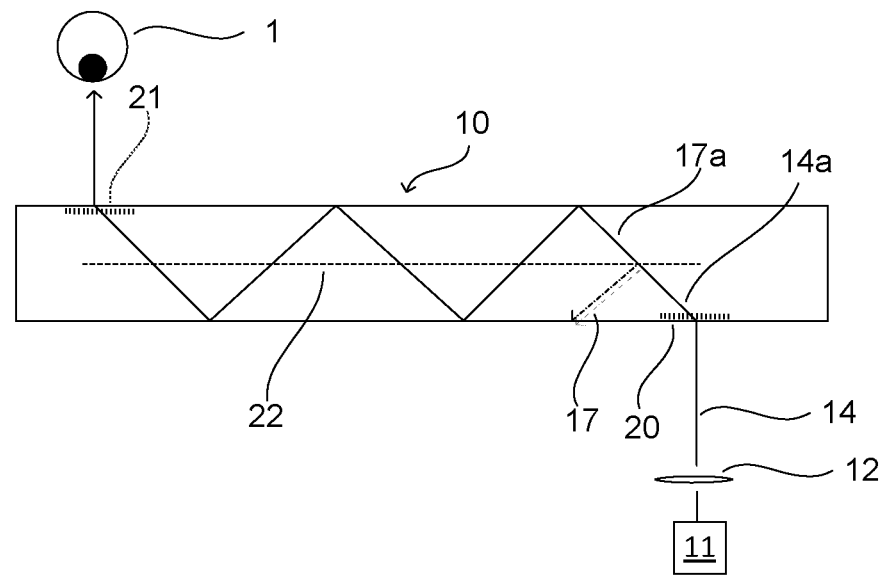
FIG. 2 shows a cross-section of a holographic waveguide structure.

The input coupling device described in FIGS. 1 and 2 is provided by the shaped end of waveguide 304, particularly surface 303 which reflects light by means of a mirror coating such that the light is trapped in the waveguide at the lower face by total internal reflection.

The shaped end shown in FIG. 3 may be formed as a unitary component of the waveguide 304, or may be a separate component joined to the waveguide 304.

A semi-reflecting surface 306 is provided within the main waveguide 304 to direct light propagating in the main waveguide 304 out to the eye box 307. The semi-reflecting surface 306 also overlays the outside-world view and projected image. Semi-reflecting surface 306 is arranged parallel to the reflecting surface of the input coupling device 303 such that ray alignment is maintained between the input and output pupils. In an example, the semi-reflecting surface 306 and upper face of the input coupling device may be arranged an angle of 24 degrees to the upper and lower surfaces of the main waveguide.

Semi-reflecting surface 306 may be provided by forming the parts of the main waveguide either side of the surface 306 as separate components, applying appropriate coatings, and then joining the components together. As well as coupling propagating light out of the device, the semi-reflecting surface also allows light from the outside world to propagate through the waveguide to the user's eye.

In an example the main waveguide 304 may be formed of glass with a generally low refractive index, for example approximately 1.52 (e.g. N-BK7 glass). The refractive of index of the main waveguide is a design choice and depends on many factors.

A secondary waveguide 308 formed of higher refractive index glass than the main waveguide (e.g. N-SF57 with a refractive index of approximately 1.85) is located on the upper surface of the main waveguide 304. The interface 309 between the main waveguide 304 and secondary waveguide 308 is designed to transmit light from the main waveguide 304 to the secondary waveguide 308 with minimal reflection (e.g. less than 10%). The interface may be formed with a low refractive index material and optical cement, which have an index of approximately 1.52. The faces of the main and/or secondary waveguide can be coated to modify the reflectivity of the interface.

The secondary waveguide 308 traps rays by total internal reflection at the top 310 and bottom 309 surfaces/interfaces. As noted above the secondary waveguide 308 has a higher refractive index that the main waveguide, thereby enabling total internal reflection at the interface 309 for rays at angles greater than the critical angle for that interface. This said total internal reflection occurs after the light is diffracted at the grating 319.

A variety of coatings may be applied to the surface 309. Modelling shows that, irrespective of the coating, this surface provides a critical angle of 55.25° for the interface 309 and 32° for the top face 310 for light of an appropriate wavelength propagating in the secondary waveguide.

A grating structure 319 is formed on the top surface 310 of the secondary waveguide 308. In an example, the grating structure 319 is normally described in the state of the art as a square wave profile (i.e. the width of the deposited material is the same as the spacing between each region of deposited material) binary grating with a single fringe depth formed of high index material, for example Titanium Dioxide. The profile of the fringe may be rectangular. An example grating design utilises 0.8 lines per micron. Titanium Dioxide has the advantage of having a higher refractive index than the N-SF57 glass, so that the electromagnetic field in the N-SF57 can set up electric and magnetic fields that propagate into the fringes, so affecting the diffraction of light energy. The calculation of such fields is complex but may be achieved by one reasonably skilled in the start of the art using available software.

The square wave grating structure is an example of a symmetrical grating profile. Such a profile type incorporates other shapes in addition to square wave, for example the grating may have a rectangular profile or a set of rectangles overlaid on each other. Such symmetrical structures may be easier to form, for example utilising photolithography techniques. The term binary grating is used to refer to gratings in which the grating is formed with only a single thickness of material.

The grating structure 319 is formed with lines on the plane of the surface 309 and parallel to the plane of the top section (a) of FIG. 3. This is shown schematically in the bottom section (b) of FIG. 3. The light is diffracted sideways, as shown by 315(a) and 315(b) in FIG. 3 and at large angles. As explained in detail below, this sideways diffraction provides pupil replication across the waveguide.

tion. By varying the depth and spacing of the grating fringes, one can vary the amount of light in the various orders. In the devices described herein, diffraction on both sides of the incident ray, shown by 315(a) and 315(b) in FIG. 3, is used in the waveguide. Thus cheaper and more reliable methods of manufacturing the grating can be employed.

In order to understand how the angles are used to project the rays through the waveguide in the absence of diffraction, the following table describes the ray angles contained within the plane of the paper in the top section (a) of FIG. 3.

The data below assumes a monochromatic light source with refractive indices of 1.52 (for example N-BK7) for waveguide 304 and 1.85 (for example N-SF57) for waveguide 308. Other wavelengths and corresponding refractive indices will broadly offer the same angles because diffraction is not included in this analysis.

| Description (in the Far Field) | Ray angle in air at the Entrance Pupil | Ray angle in waveguide 304 before reflection from 303 | Ray angle in waveguide 304 after reflection from 303 | Ray angle incident at the interface from waveguide 304 and into waveguide 308 | Ray angle incident at the interface from waveguide 308 and into waveguide 304 | Ray angle incident at the top surface of waveguide 308 |
|---|---|---|---|---|---|---|
| Central ray | 0 | 0 | 48 | 48 | 37.6317 | 37.6317 |
| Upper ray | +10 | +6.5599 | 41.4401 | 41.4401 | 32.9413 | 32.9413 |
| Lower ray | −10 | −6.5599 | 54.5599 | 54.5599 | 42.0203 | 42.0203 |

The grating may be formed on the surface using a conventional photolithography technique by depositing, patterning, and removing photoresist, and then coating the exposed waveguide surface with Titanium Dioxide to a thickness of ¼ wavelength. The remaining photoresist and stray material is then removed, leaving the Titanium Dioxide grating. In the simpler case where only one layer of Titanium Dioxide is used, variations in the thickness of the material will create variations in distributions in flux diffracted into the +1, −1 and 0 orders.

The sides 311, 318, 320 of the main waveguide 304 and secondary waveguide 308 may be coated with an absorbent coating to absorb any stray or ghost rays trapped in the main waveguide.

In use input light enters the input pupil 303 and is reflected from the upper surface of input coupler 303 into the main waveguide 304 forming ray 320. The light is reflected from the lower face 305 of the main waveguide by total internal reflection.

When the ray meets the interface 309 the majority 312 of the light passes through 309 into the secondary waveguide 308, but a small portion 313 is reflected by the interface and continues in the main waveguide 304. The ratio of reflected and transmitted light is defined by the coating and cement at the interface 309. In an example design 90% of the light propagates into the secondary waveguide 308. The ray 312 is refracted as it traverses the interface 309 and thus the propagation angles within the secondary waveguide 308 are different to those in the primary waveguide 304. The refraction is reversed as the ray re-enters the main waveguide 304, as explained below, and thus ray direction in the main waveguide 304 is maintained.

Ray 312 propagates to the outer surface of the secondary waveguide 308. At that surface the light is interacts with the grating 319, which diffracts the light into multiple directions called diffracted orders. The zeroth order is diffracted in the same direction as would be caused by total internal reflec- The above term 'ray angle' refers to the Angle of Incidence on the outer surfaces of the parts, from inside the glass, which are labelled 305, 309 and 319 in FIG. 3, with a definition that is well known in the state of the art.

So the range between the upper and lower rays projects a 20 degree vertical field of view. The ray angles of the upper ray are just large enough to experience total internal reflection. Since the 55.25 degree critical angle at the boundary 309 refers to light coming from inside the waveguide 308 glass, and the critical angle is around 55.25 degrees, then all the rays are well within the critical angle and total internal reflection does not occur unless light is diffracted at the grating 319.

Without diffraction at grating 319, the ray 302 is broadly transmitted into the waveguide at 301. The reflection by 303 changes its angle to trap it in the waveguide by total internal reflection. At interface 309 it is mostly transmitted into 308 and totally internally reflected from 319. At the interface 309 it is mostly transmitted back into 304. When it reflects from 306 its angle is changed such that it mostly exits the waveguide at 309 and intersects the exit pupil 307. This invention adds a diffractive process at grating 319 that increases the ray angle when re-intersecting interface surface 309.

Thus the diffraction process at grating 319 enables the secondary waveguide 308 to trap light by total internal reflection and to replicate the pupil in the direction perpendicular to the plane of the diagram of FIG. 3(a).

In the example given in the table above, the range of angles of incidence in the main waveguide 304 is between 41.44 and 54.56 degrees. In the secondary waveguide 308 the range is 32.94 to 42.02 degrees. The Total Internal reflection condition for the main waveguide 304 to air is 41.14 degrees such that light above this angle is reflected by 100%, the total internal reflection angle for the secondary waveguide 317 to air is 32.58 degrees, and the total internal reflection angle for the secondary waveguide to the main waveguide 304 is 55.25 degrees.

The interaction of the light 312 with the grating 319 results in diffraction into one or more diffraction orders. As noted above the diffraction efficiency depends on the grating design, but typically most of the light is diffracted into the zero and +/−1 orders.

The direction of the zero order diffraction 314 is unaffected by the grating and the ray reflects from the surface as per normal total internal reflection, at the same angle of incidence in the range 32.94 to 42.02°. As noted above the interface 309 has a critical angle of 55.25° and so the ray 314 propagates into the main waveguide 304. As the ray crosses the interface 309 it is refracted back to its original propagation direction and thus the far field is not distorted. As can be seen in FIG. 3 the ray 314 is slightly offset from ray 313 (reflected by the interface 309) providing a small amount (exaggerated by the scale of FIG. 3), such that the combination of rays provides a small amount of pupil replication in that direction.

Light is also diffracted from the grating 319 into the +/−1 order 315($a$) and ($b$), which has a sideways component to the ray direction, and a reduced vertical component (in the view of FIG. 3($a$)) compared to the incident ray.

Figure 4:
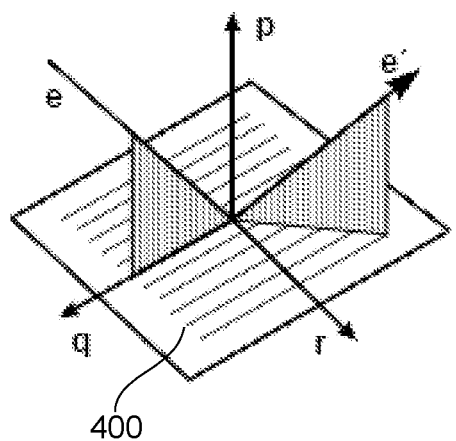
FIG. 4 shows a diagram of the mathematics describing the diffraction process.

FIG. 4 shows a diagram of an incident ray e interacting with a grating 400. The diffracted ray is e'. e and e' are unit vectors for the incident and diffracted rays, p is a unit vector normal to the diffraction grating, q is a unit vector parallel to the grating lines which is multiplied with a scalar magnitude of (Mλ/d), and r is a unit vector perpendicular to the grating lines, in the plane of the grating 400.

The vector equation for rays e and e' can be written as:

$$n'e' \times p = ne \times p + \left(\frac{M\lambda}{d}\right)q$$

The following describes calculations of the diffraction at grating 319 using terminology that one reasonably skilled in the art will understand, such as the symbols n and n' represent the refractive indices before and after diffraction. The term (Mλ/d) is the diffraction order M multiplied by the wavelength of the light λ divided by the fringe spacing d. The explanation serves to describe how the ray angles change so as to change the path of the rays through the main waveguide 304 and secondary waveguide 308.

Calculations are performed in the conventional fashion using (x,y,z) Cartesian coordinates with corresponding direction cosines (k,l,m). Unit vectors (i,j,k) are parallel to the (x,y,z) axes. To simplify the algebra, p has values (0i+0j+k)=(k); and q is parallel to the x axis.

e has direction cosines $(k_e, l_e, m_e)$ such that its cross product with p is $(l_e, -k_e, 0)$. The vector e'×p therefore has the values $(M\lambda/d+l_e, -k_e, 0)$. The vector e' therefore has components $(k_e, l_e+M\lambda/d, -1 \cdot m_{e'})$ where $m_{e'}$ is calculated to make e' a unit vector, and is negative to signify the reflection rather than transmission of the ray by the diffraction process.

The values of $m_e$ and $m_{e'}$ describe the cosine of the angle of incidence, which is also termed ray angle in the table above. Hence if the absolute value of $m_e$ or $m_{e'}$ are less than a certain value, total internal reflection occurs at the boundary 309 between the secondary waveguide 308 and the main waveguide 304.

Applying this nomenclature to the rays of FIG. 3, that is to say applying the coordinate system described above at grating 319 to the whole of the waveguide, one ray can be described as shown in the following table

| Reference numeral | K | L | M |
|---|---|---|---|
| 302 | 0 | 0 | 1 |
| 320 | $K_{320} = \sin(2a)$ | 0 | $m_{320} = \cos(2a)$ |
| 312 | $K_{312} = n_{3048} \times \sin(2a)/n_{3084}$ | 0 | $\sqrt{(1 - k_{312}^2)}$ |
| 315 | $K_{315} = k_{312}$ | $l_{315} = M\lambda/d$ | $m_{315} = -\sqrt{(1 - l_{315}^2 - k_{312}^2)}$ |

Where 'a' is the angle of the input face from which ray 302 is reflected, M is the diffraction is order, $n_{304}$ is the refractive index of the main waveguide, and $n_{308}$ is the refractive index of the secondary waveguide. The negative sign in the equation for $m_{315}$ is describing the fact that ray 315 is effectively reflected at the grating 319 and propagates in generally the opposite direction to ray 312; this is a conventional mathematical method within the state of the art to describe reflective diffraction.

The effect of the interaction with the grating is thus that the vertical (z) component (in the view of FIG. 3($a$) is reduced, and a sideways component (visible in FIG. 3($b$)) is added, as represented by ray 315 in FIG. 2. As can be seen in FIG. 3($b$) the sideways component is significant and the ray is deviated to a direction substantially orthogonal to an axis from the input end to the output end. Two rays 315($a$) and 315($b$) are present due to the + and − diffraction orders. FIG. 3 only shows one diffraction order (+/−1), but some light may also be diffracted into higher orders, although the magnitude is small and therefore need not be discussed in detail. In FIG. 3($b$) "Spot" symbols represent interactions with the interface 309 and "cross" symbols represent interactions with the outer surface and grating 319. Line types correspond to those of FIG. 3($a$).

As a result of the diffraction, ray 315 thus has an increased angle of incidence with the interface 309. In an example the $1^{st}$ order diffraction has an angle of incidence of higher than the critical angle of 52.25° to interface 309 and the ray is thus reflected by total internal reflection and is trapped in secondary waveguide 308. If the ray 315 were allowed to propagate into the main waveguide 304, and was ejected at the output into the eye box 307, it would degrade the far field image as it would not be parallel to the other rays for the respective pixel.

Ray 315 propagates back to the grating at location 316 and again interacts with the grating 319. The same process as described above occurs at this interaction.

Referring to the above equations, the ray 315 leaving the grating 319 has direction cosines of:

$(k_e, l_e + M\lambda/d, -1 \cdot m_{e'})$

Which are the components of a unit vector parallel to the ray. The reflection of ray 315 occurring at interface surface 309 changes the sign of the direction cosine back to a positive value, so that the ray interacting with the grating 319 a second time has direction cosines:

$(k_e, l_e + M\lambda/d, m_{e'})$

The cross product with the surface normal then has the components:

$(l_e + M\lambda/d, -k_e, 0)$

In the case where new diffraction occurs at grating 319 into order −M, then the cross product is modified by this process through the addition of a component:

$(-M\lambda/d, 0, 0)$

The new ray therefore has a cross product with unit vector p that has the components:

($l_e$,−$k_e$,0)

Which corresponds to the unit vector describing the ray having components of:

($k_e$,$l_e$,$m_e$)

The second diffraction process into order −M therefore reconstructs the angles of the original ray 312, but at a position that is displaced from the original intersection with grating 319. The reconstructed ray is shown as item 350 in FIG. 3. The grating properties of fringe profile shape, line spacing and fringe depth can be varied to vary the relative amounts of light energy that is diffracted into the light paths 315 and 350, enabling pupil replication to be designed into the waveguide.

Some light will be diffracted in the zero order and continue to be trapped in the secondary waveguide as ray direction is the same as ray 315. Light will also be diffracted into the +/−1 order, one of which will be aligned with the original ray 312. The diffracted ray 350 is thus returned to the direction of ray 312 and has an angle of incidence less than 55.25° and can thus propagate through interface 309 back into the main waveguide 304. The previous refraction at interface 309 is reversed as the ray traverses the interface and the ray in the main waveguide 304 is thus aligned with the original ray 313 preserving the far field image. However, the ray has been moved sideways (perpendicular to the plane of FIG. 3(a)), thus replicating the pupil in the y direction.

Subsequent interactions with the interface 309 proceed as described hereinbefore, but for clarity only the parts of the rays trapped in the main waveguide are shown. The exit pupil 307 has thus been expanded laterally by the diffraction process. Longitudinal pupil expansion is mainly provided by combinations of semi-reflecting surfaces, such as is achieved by coating surface 309 to reflect more light; and by splitting the semi-reflecting surface 306 up into multiple surfaces through the addition of multiple end pieces 306.

The rays 313, 314, 317 are reflected by partially reflecting surface 306 out to the eye box 307. As explained above the ray directions in the main waveguide are maintained after the first reflection in the input prism 303, and surface 306 is parallel to the reflecting surface of the input prism, and are thus parallel after reflection from surface 306. The image projected by projector 300 is thus recreated at eye box 307, but is expanded laterally and longitudinally by the processes described above.

The portion of light which passes through the partially reflecting surface 306 remains trapped by total internal reflection in the main waveguide and is ultimately absorbed by the coated faces of the waveguide.

The coating between the primary and secondary waveguides serves to couple the required portion of light into the secondary waveguide. This portion is normally mostly transmitted unless it is subject to total internal reflection, as described in the above text. The coating may also be made partially reflective to increase pupil replication substantially parallel to the plane of the upper section of FIG. 3.

The coating on the interface surface 309 may be selected to approximately divide the light up such that approximately 50% is transmitted and approximately 50% is reflected, thus putting more flux into other ray paths and providing more longitudinal pupil replication.

The design of the coating may also be such that the fall off in reflection at ray angles just below the critical angle at interface surface 309 is reduced, which enables an increase in the range of ray angles that are trapped in the secondary waveguide 308.

Simple examples of coatings at the interface surface 309 are shown in FIGS. 5, 6, 7, 8 and 9. In each case, the glue used to bond the main waveguide 304 to the coated secondary waveguide 308 is assumed to be index matched to the glass of the main waveguide 304 (for example N-BK7), such that it may be ignored in the calculations of coating performance.

Figure 5:
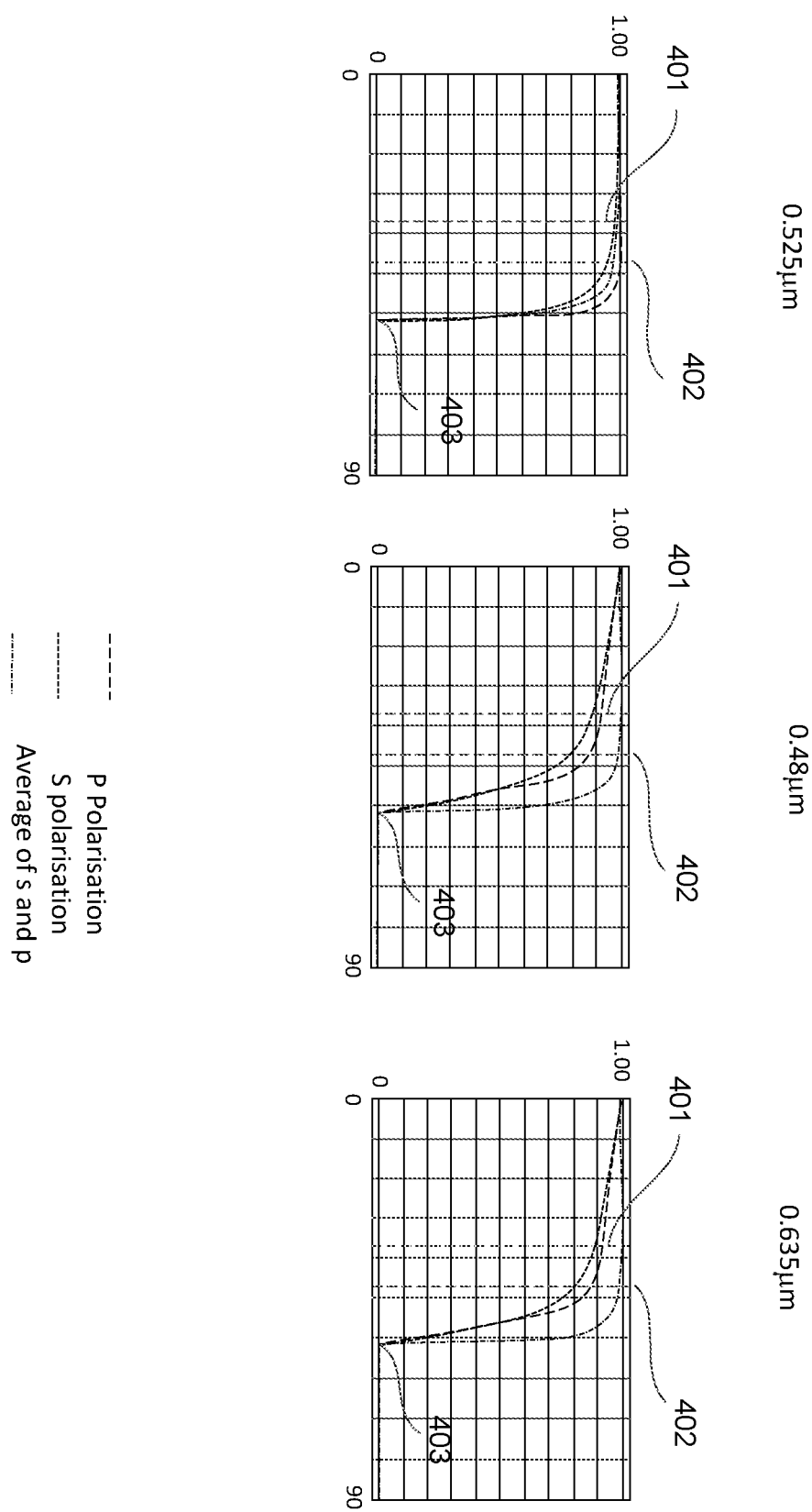
FIG. 5 shows charts of transmission through an uncoated interface.

FIG. 5 shows the transmission versus angle of an uncoated interface surface 309 for three wavelengths (0.635 μm (red light), 0.525 μm (green light), and 0.48 μm (blue light)). The angle is plotted on the horizontal axis, and refers to the angle of incidence of a ray that intersects the interface surface 309 from within the secondary waveguide 308. Trace P is for the p-polarisation, S is for the s-polarisation, and A is the average of the two polarisations.

The range of angles needed to project the image through the main waveguide 304 is shown by the marker lines 401 and 402. The diffraction grating 319 will increase the range of angles of incidence to greater than the critical angle 403. The uncoated surface works well in that the range of angles between 401 and 402 are transmitted with good efficiency and little polarization-dependency; and there is little variation between the green, red and blue wavelengths; and the critical angle provides a well-defined transition to total internal reflection.

Figure 6:
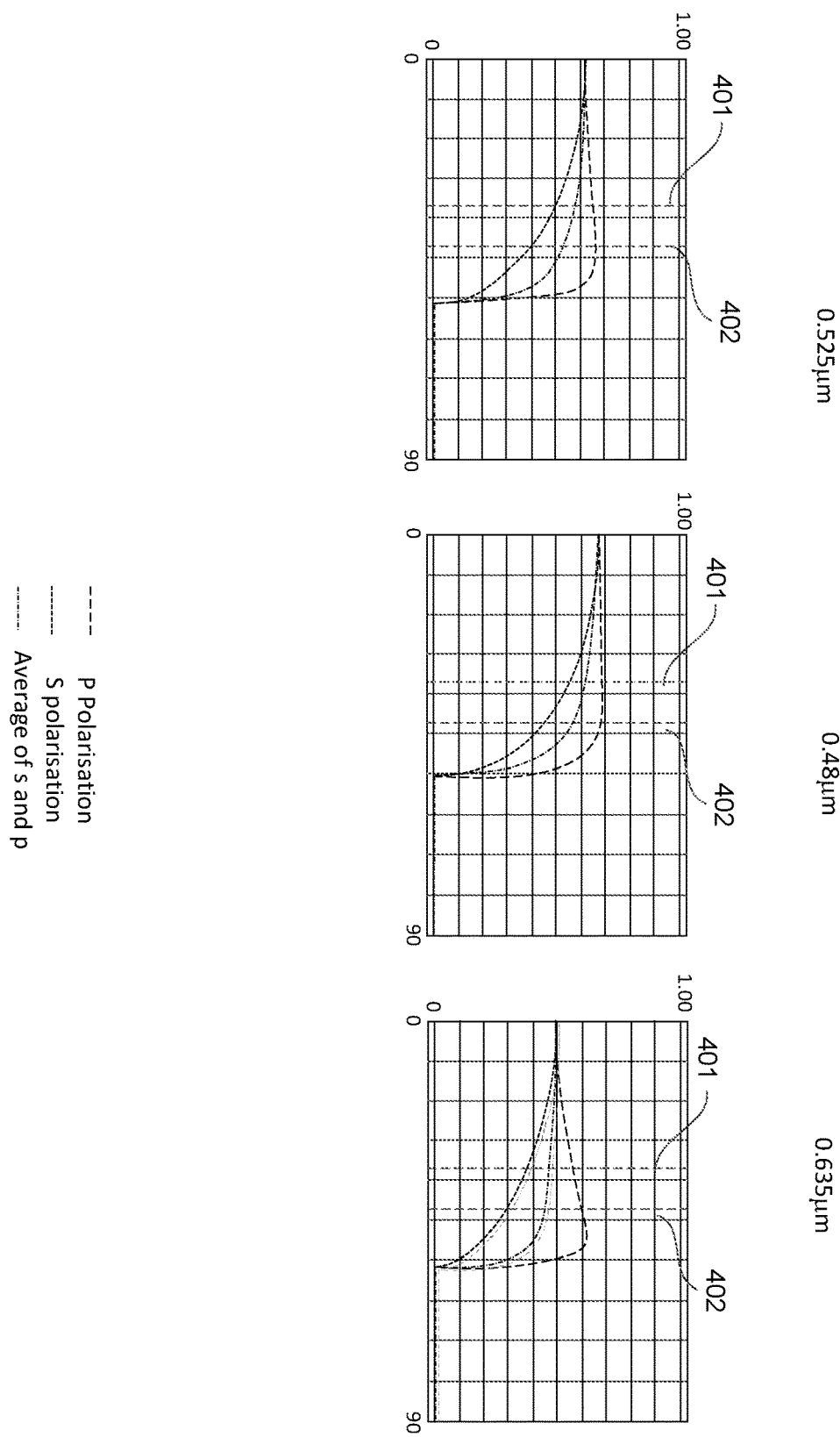
FIGS. 6-9 show charts of transmission through an interface with various coatings.

The effect of coating the interface surface with a thin layer of Silver is shown in FIG. 6. The three charts and nomenclature correspond to the charts described in relation to FIG. 5. This is close to the 50% transmission and 50% reflection coating described above. The coating absorbs 2-4% over the range of angles within the main waveguide 304, which is acceptable for many designs where the waveguide has only a few interactions. The coating absorbs up to 10% at angles around 60 degrees; where the interface surface is acting as totally internally reflecting and an evanescent wave is generated within the coating; so the coating can only work with a few pupil replications laterally within the secondary waveguide 308. However, the coating has the advantage that more flux is reflected into the main waveguide 304 on interacting with the interface surface 309 from the N-BK7 side; so greater longitudinal pupil replication is illuminated.

The coating is polarizing, as indicated by the difference between the curves p and s in FIG. 6, which will not induce a noticeable effect provided that no other substantially polarizing device exists within the optical system. It should be noted that this is common within the state of the art, in that holographic waveguides usually contain partially polarising gratings.

Figure 7:
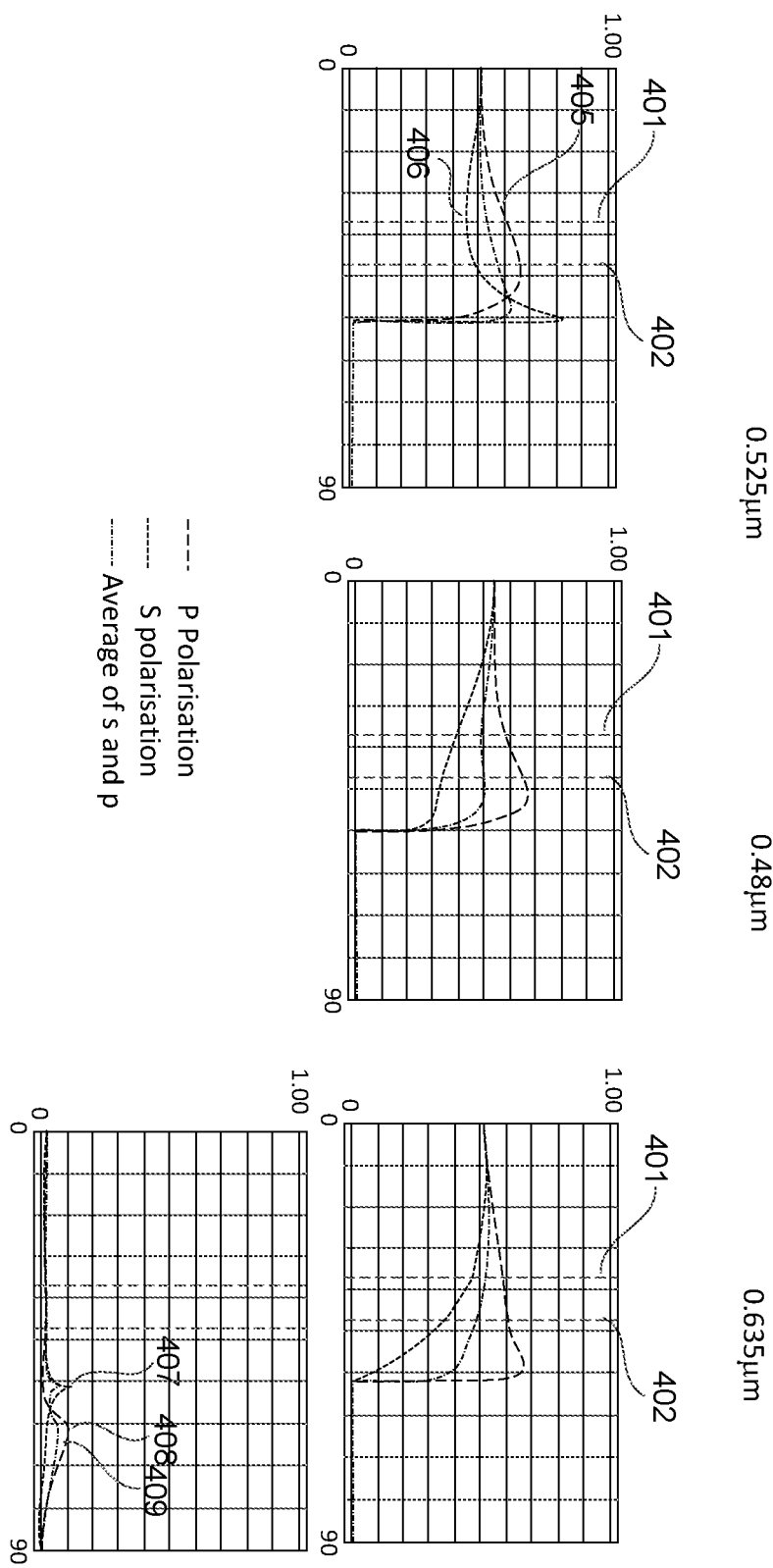

FIG. 7 shows the transmission of a slightly more complex Silver coating, which has been enhanced by the addition of dielectric layers between the Silver and the main waveguide 304. The three charts and nomenclature correspond to the charts described in relation to FIG. 5, with an additional chart showing absorption. This serves to reduce the polarization differences whilst maintaining average absorption below 10% above the critical angle.

The difference in polarization transmission is in FIG. 7, which exhibits a bit better polarisation stability. The absorption is shown on FIG. 7 for S polarization 407, and P polarization 408, and the average absorption 409.

The prescription for this coating is given in the following table, where 1 wavelength is 0.525 microns:

| Layer | Material | Optical thickness in wavelengths |
|---|---|---|
| Incident medium | Schott N-SF57 | |
| Layer 1 | Silver | 0.00161114 |
| Layer 2 | Silicon Dioxide | 0.0617912 |
| Layer 3 | Titanium Dioxide | 0.69932 |
| Layer 4 | Silicon Dioxide | 0.0631039 |
| Layer 5 | Titanium Dioxide | 0.0740115 |
| Glue layer | Index matched to Schott N-BK7 | 20 |
| Substrate | Schott N-BK7 | |

Figure 8:
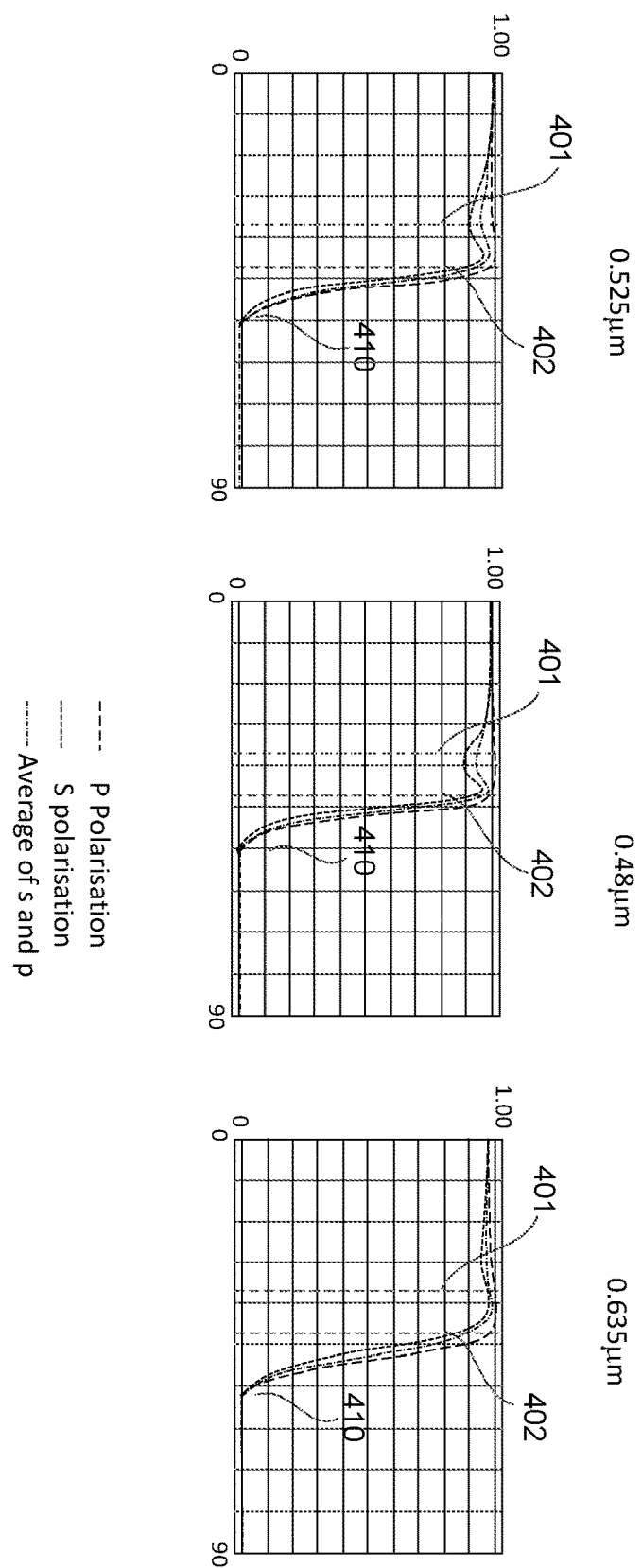

An example of a coating with enhanced reflection just below the critical angle is shown in FIG. 8. The three charts and nomenclature correspond to the charts described in relation to FIG. 5. The coating comprises of a 1 wavelength thick layer of Magnesium Fluoride. Because this is a dielectric material, the reflection coefficient is 1—the transmission coefficient. Therefore, the feature 410 in FIG. 8 is indicative of a reduction of reflection losses just below critical angle for light that is intended to be trapped in the secondary waveguide 308.

Compared to FIGS. 5, 6 and 7, the change in transmission at the critical angle is no longer a sharp feature, such that the effective range of angles that can be propagated within the secondary waveguide 308 is increased by a few degrees. The resultant losses are adequate provided there are a few interactions; and provided that stray light is designed to miss the observer's eye.

Figure 9:
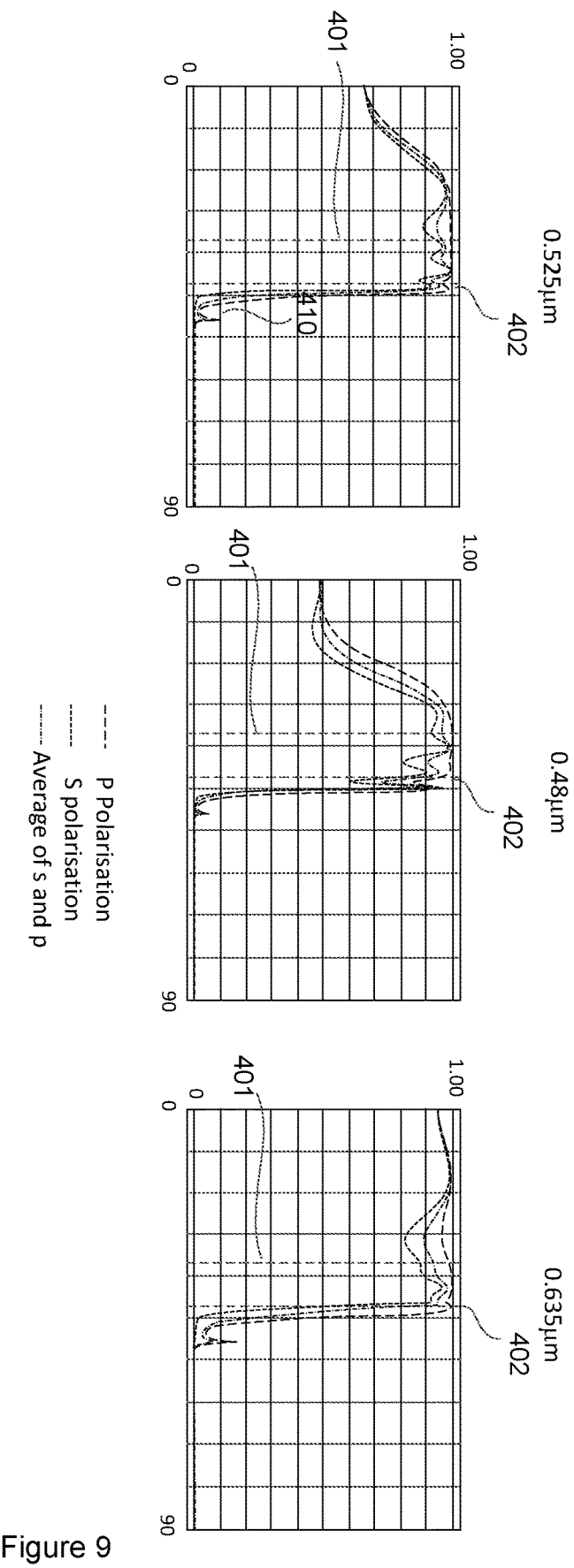

A more complicated coating is shown in the table below and in FIG. 9. This coating is indicative of how the TIR region may be extended further down to around 46 degrees angle of incidence (in the N-SF57 glass), as indicated by the feature 410 on FIG. 9. The un-diffracted and reconstructed light is designed to have angle of incidence between lines 401 and 402 on FIG. 9. This coating would be useful if the extension of the TIR condition by the coating described in FIG. 8 is insufficient. The coating effectively increases the bandwidth of the secondary waveguide 308, by means of trapping rays that would otherwise leak into stray light paths within the main waveguide 304. It would be preferentially used with a grating 319 of pitch 0.8 microns as aforementioned to replicate the pupil of a 30 by 20 degree field of view; though some minor loss in luminance would still occur in the corners of the field of view. The prescription for this coating is given in the following table, where 1 wavelength is 0.525 microns:

| Layer | Material | Optical thickness in wavelengths |
|---|---|---|
| Incident medium | Schott N-SF57 | |
| Layer 1 | Magnesium Fluoride | 0.86884 |
| Layer 2 | Titanium Dioxide | 1.10278 |
| Layer 3 | Magnesium Fluoride | 0.869488 |
| Layer 4 | Titanium Dioxide | 0.137148 |
| Layer 5 | Magnesium Fluoride | 0.171519 |
| Layer 6 | Titanium Dioxide | 0.115306 |
| Layer 7 | Magnesium Fluoride | 0.749057 |
| Substrate | Schott N-BK7 | |

Whatever coating is selected for the interface surface 309, any reflection from the image that intersects the interface surface 309 from the main waveguide 304 side will be reflected back into the main waveguide 304 and be recycled into further pupil replication.

The action of diffraction at grating 319 is to change the ray angles at the interface surface 309 such that the rays are trapped in the secondary waveguide 308 by total internal reflection. The geometry of the trapped rays regarding their angles may be adjusted by adjusting the details of the grating 319, such as fringe depth, fringe profile and fringe spacing.

Such adjustments may usefully change the design to improve the uniformity of the near and far fields. The trade-offs so introduced may be enhanced by reducing the lesser diffracted ray angles such that some intersect the interface surface 309 at below critical angle. In this case, some diffracted light will leak into the main waveguide 304. This may be arranged to be acceptable by designing the geometry of the main waveguide and the details of the grating 319 such that, after reflection from the semi-reflecting surface 306, the rays miss the exit pupil 307 and cannot be seen by the observer.

The arrangements described hereinbefore allow the use of lower cost gratings by trapped higher order diffracted rays in the secondary waveguide. Lateral expansion of the pupil is achieved using a binary grating structure, where the light is diffracted in two directions at the grating 319.

Hence, cheaper mass produced gratings can be used to expand pupil replication instead of blazed gratings which as explained above are difficult to manufacture. In order to increase the pupil expansion in the direction of the plane of the upper section of FIG. 3, a plurality of partially reflecting surfaces 306 (all parallel with each other) may be utilized.

The above description has been given in relation to a square wave binary grating, but the principles apply in the same way to any grating design which diffracts into more than one order in opposite directions (here the +/−1 orders). For example, sinusoidal or symmetrical triangle gratings may be utilized. Such gratings may still be substantially easier to fabricate than uni-directional blazed gratings as the saw tooth pattern required is notoriously difficult to fabricate accurately.

Examples of manufacturing methods include gratings with multiple layers, where photolithography is used to reproduce more than one layer in a stack. Each layer is characterised by a profile that causes a phase change in the light irradiating the grating, the said profile being composed of a repetitive pattern. The fringe spacing is the distance over which the profile repeats its shape. Within that shape, there are generally areas that have no material deposited and others which do have material. Photolithographic techniques generally produce an equal deposited thickness over those areas that have deposited material. If the deposited width is the same as the width that is clear of deposited material, then the term 'square wave grating' generally describes the detail of the grating. However, the term also effectively describes a rectangular profile where the deposited material is a different width from the clear area. Additional structures may be produced by depositing multiple gratings over each other, in which the width of the deposited material changes with different layers, and generally reduces in width as more layers are added, but not necessarily. This method may be used to approximately deposit a blazed grating, but not with the full effect. Therefore the gratings produced by photolithographic methods will exhibit diffraction into more than one order, such that a significant amount of light is diffracted in opposing directions.

Grating profiles similar to a sinusoidal depth profile can be produced by exposing a light sensitive layer with an interference pattern produced by holographic methods, where the light sensitive layer is selected to have a variable response to its exposure to light.

Although the present invention has been described in connection with some embodiment, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. An optical waveguide for a head up display, the optical waveguide being configured to provide pupil expansion in two dimensions, the waveguide comprising:
a primary waveguide having an input end and an output end;
a secondary waveguide positioned on a face of the primary waveguide between the input end and the output end, there being an interface between the primary waveguide and secondary waveguide, the refractive index of the primary waveguide being lower than the refractive index of the secondary waveguide; and
a main diffraction grating on a face of the secondary waveguide, which face is parallel and opposite to the interface with the primary waveguide, wherein lines of the main diffraction grating extend along their length in a direction that is parallel with an axis from the input end to the output end of the primary waveguide.

2. The optical waveguide according to claim 1, further comprising an optical coating between the primary and secondary waveguides.

3. The optical waveguide according to claim 1, wherein the main diffraction grating diffracts at least some incident light in a direction substantially orthogonal to an axis from the input end to the output end.

4. The optical waveguide according to claim 1, further comprising an input section, wherein the input section is configured to couple light into the primary waveguide such that the light is guided by total internal reflection at waveguide/air interfaces of the primary waveguide and of the secondary waveguide.

5. The optical waveguide according to claim 1, further comprising an output section at the output end of the primary waveguide, wherein the output section is configured to direct light propagating in the primary waveguide out of that waveguide to an output pupil of the optical waveguide.

6. The optical waveguide according to claim 4, further comprising an output section at the output end of the primary waveguide, wherein the output section is configured to direct light propagating in the primary waveguide out of that waveguide to an output pupil of the optical waveguide, and wherein the input section comprises a face of the primary waveguide which reflects light by total internal reflection, and the output section comprises a partially reflective mirror in a plane which is parallel to the face of the primary waveguide forming the input section.

7. The optical waveguide according to claim 4, further comprising an output section at the output end of the primary waveguide, wherein the output section is configured to direct light propagating in the primary waveguide out of that waveguide to an output pupil of the optical waveguide, and wherein the input section comprises a face of the primary waveguide which reflects light by total internal reflection, and wherein the output section comprises a partially reflective mirror in a plane parallel to the face of the primary waveguide forming the input section.

8. The optical waveguide according to claim 4, further comprising an output section at the output end of the primary waveguide, wherein the output section is configured to direct light propagating in the primary waveguide out of that waveguide to an output pupil of the optical waveguide, wherein the input section comprises an input diffraction grating, and the output section comprises an output diffraction grating.

9. The optical waveguide according to claim 1, wherein the main diffraction grating diffracts incident light into at least a zero and a first diffraction order, and wherein the interface is configured such that light diffracted into the first diffraction order is reflected by total internal reflection at the interface, while light in the zero diffraction order passes through the interface.

10. The optical waveguide according to claim 1, wherein the main diffraction grating diffracts incident light into at least a zero, and two first diffraction orders, and wherein the two first diffracted orders traverse the secondary waveguide in opposing lateral directions relative to an axis from the input end to the output end, and wherein the interface is configured such that light diffracted into the first diffraction orders are reflected by total internal reflection at the interface, while light in the zero diffraction order passes through the interface.

11. The optical waveguide according to claim 1, wherein the main diffraction grating diffracts incident light into at least a zero, two first, and a third diffracted order, and wherein the interface is configured such that light diffracted into the first and third diffraction orders are reflected by total internal reflection at the interface, while light in the zero diffraction order passes through the interface.

12. The optical waveguide according to claim 1, wherein the depth of the main diffraction grating fringe profile is varied across the aperture of the main diffraction grating to vary the amount of light in the diffracted orders.

13. The optical waveguide according to claim 1, wherein the light paths in the secondary waveguide are designed such that not all diffracted rays are trapped by total internal reflection, such that the bandwidth of the secondary waveguide is increased; and so arranged such that diffracted rays that are not trapped exit the waveguide at an angle such that the rays miss the exit pupil.

14. The optical waveguide according to claim 7, wherein the main diffraction grating fringe profile is approximately blazed such that the majority, but not all, light incident on the main diffraction grating is diffracted into one of the first diffracted orders and zero order.

15. The optical waveguide according to claim 1, wherein the interface is partially reflective.

16. The optical waveguide according to claim 1, wherein the main diffraction grating is configured to diffract light into more than one diffraction order.

17. The optical waveguide according to claim 1, wherein the main diffraction grating is selected from a binary diffraction grating, a symmetrical triangle grating, a sinusoidal grating, or a grating with all faces in a first or a second plane wherein the first and second planes are perpendicular to each other.

18. The optical waveguide according to claim 1, wherein the light paths in the secondary waveguide are designed such that not all diffracted rays are trapped by total internal reflection, such that the bandwidth of the secondary waveguide is increased.

19. An optical waveguide for a head up display, the optical waveguide being configured to provide pupil expansion in two dimensions, the waveguide comprising:
   a primary waveguide having an input end and an output end;
   a secondary waveguide positioned on a face of the primary waveguide between the input end and the output end, there being an interface between the primary waveguide and secondary waveguide, the refractive index of the primary waveguide being lower than the refractive index of the secondary waveguide;
   a main diffraction grating on a face of the secondary waveguide, which face is parallel and opposite to the interface with the primary waveguide, wherein lines of the main diffraction grating extend along their length in a direction that is parallel with an axis from the input end to the output end of the primary waveguide;
   an input section, wherein the input section is configured to couple light into the primary waveguide such that the light is guided by total internal reflection at waveguide/air interfaces of the primary waveguide and of the secondary waveguide; and
   an output section at the output end of the primary waveguide, wherein the output section is configured to direct light propagating in the primary waveguide out of that waveguide to an output pupil of the optical waveguide.

20. The optical waveguide according to claim 19, wherein the input section comprises an input diffraction grating, and the output section comprises an output diffraction grating.

* * * * *